US009965417B1

United States Patent
Azad et al.

(10) Patent No.: US 9,965,417 B1
(45) Date of Patent: May 8, 2018

(54) USE OF INTERRUPT MEMORY FOR COMMUNICATION VIA PCIE COMMUNICATION FABRIC

(71) Applicant: Xilinx, Inc., San Jose, CA (US)

(72) Inventors: Sarosh I. Azad, Fremont, CA (US); Sunita Jain, Bangalore (IN)

(73) Assignee: XILINX, INC., San Jose, CA (US)

( * ) Notice: Subject to any disclaimer, the term of this patent is extended or adjusted under 35 U.S.C. 154(b) by 150 days.

(21) Appl. No.: 14/995,124

(22) Filed: Jan. 13, 2016

(51) Int. Cl.
*G06F 13/32* (2006.01)
*G06F 13/16* (2006.01)
*G06F 13/42* (2006.01)
*G06F 12/1081* (2016.01)

(52) U.S. Cl.
CPC .......... *G06F 13/32* (2013.01); *G06F 12/1081* (2013.01); *G06F 13/1642* (2013.01); *G06F 13/4282* (2013.01); *G06F 2212/656* (2013.01)

(58) Field of Classification Search
None
See application file for complete search history.

(56) References Cited

U.S. PATENT DOCUMENTS

| 6,332,184 | B1 * | 12/2001 | Campbell | G06F 12/1027 711/153 |
| 8,122,177 | B1 * | 2/2012 | Puranik | G06F 13/28 710/308 |
| 9,645,866 | B2 * | 5/2017 | Bourd | G06F 9/544 |
| 2003/0018892 | A1 * | 1/2003 | Tello | G06F 21/123 713/164 |
| 2007/0050580 | A1 * | 3/2007 | Lewis | G06F 12/1483 711/163 |
| 2007/0165035 | A1 * | 7/2007 | Duluk, Jr. | G06T 1/60 345/506 |
| 2007/0245033 | A1 * | 10/2007 | Gavrilescu | H04L 29/12801 709/230 |
| 2008/0141279 | A1 * | 6/2008 | Mattson | G06F 8/453 719/313 |
| 2012/0079174 | A1 * | 3/2012 | Nellans | G06F 12/0246 711/103 |
| 2014/0189212 | A1 * | 7/2014 | Slaight | G06F 12/0866 711/103 |
| 2014/0250253 | A1 * | 9/2014 | Luo | G06F 13/4022 710/313 |
| 2015/0169226 | A1 * | 6/2015 | Shen | G06F 12/0238 711/103 |
| 2015/0326684 | A1 * | 11/2015 | Takefman | G06F 9/54 709/212 |
| 2016/0224442 | A1 * | 8/2016 | Sanghi | G06F 11/2028 |

* cited by examiner

*Primary Examiner* — Michael Sun
(74) *Attorney, Agent, or Firm* — Keith Taboada; Carleton Clauss (57) ABSTRACT

Techniques for communication with a host system via a peripheral component interconnect express (PCIe) communication fabric are disclosed herein. A peripheral device having its own memory address space executes a boot ROM to initialize a PCIe-to internal memory address space bridge and to disable MSIx interrupts. The peripheral device monitors a specific location in memory dedicated to MSIx interrupts for a particular value that indicates that PCIe device enumeration is complete. At this point, the peripheral device knows that its PCIe base address registers have been set by the host, and sets address translation registers for translating addresses in the address space of the host to the address space of the peripheral device.

18 Claims, 4 Drawing Sheets

USE OF INTERRUPT MEMORY FOR COMMUNICATION VIA PCIE COMMUNICATION FABRIC

TECHNICAL FIELD

Examples of the present disclosure generally relate to electronic circuit design and, in particular, to use of interrupt memory for communication via peripheral component interconnect express (PCIe) communication fabric.

BACKGROUND

Peripheral component interconnect express (PCIe) is a popular interconnect fabric for coupling a main "host" processor to peripheral devices. When a host processor starts up, the host processor performs device enumeration to identify and configure peripheral devices. Some devices have a need of discovering when enumeration for the device has completed. Unfortunately, the PCIe standard defines no mechanism for informing peripheral devices that enumeration has completed.

SUMMARY

An electronic device is provided. The electronic device includes a processor, a memory coupled to the processor and storing instructions for execution by the processor, an interrupt memory, and an interconnect fabric bridge coupled to the processor and to the interrupt memory. The interconnect fabric bridge includes a translation register and is configured to translate memory addresses in a first memory address space associated with a host processor external to the electronic device to memory addresses in a second memory address space associated with the memory that is coupled to the processor, based on a translation value stored in the translation register. The instructions stored in the memory cause the processor to wait for an enumeration-complete indication value to be stored at an enumeration complete location within the interrupt memory, and upon detecting that the enumeration-complete indication value is stored at the enumeration complete location, assign the translation value to the translation register.

A method is provided. The method includes translating memory addresses in a first memory address space associated with a host processor external to an electronic device to memory addresses in a second memory address space associated with a second memory memory that is coupled to a processor internal to the electronic device, based on a translation value stored in a translation register included within an interconnect fabric bridge that is coupled to the processor and to an interrupt memory. The method also includes waiting for an enumeration-complete indication value to be stored at an enumeration complete location within the interrupt memory. The method further includes upon detecting that the enumeration-complete indication value is stored at the enumeration complete location, assigning the translation value to the translation register.

A non-transitory computer-readable medium is also provided. The non-transitory computer-readable medium stores instructions that, when executed by a processor, cause the processor to perform a method. The method includes translating memory addresses in a first memory address space associated with a host processor external to an electronic device to memory addresses in a second memory address space associated with a second memory memory that is coupled to a processor internal to the electronic device, based on a translation value stored in a translation register included within an interconnect fabric bridge that is coupled to the processor and to an interrupt memory. The method also includes waiting for an enumeration-complete indication value to be stored at an enumeration complete location within the interrupt memory. The method further includes upon detecting that the enumeration-complete indication value is stored at the enumeration complete location, assigning the translation value to the translation register.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting in scope.

To facilitate understanding, identical reference numerals have been used, where possible, to designate identical elements that are common to the figures. It is contemplated that elements of one example may be beneficially incorporated in other examples.

DETAILED DESCRIPTION

Techniques for securely informing a device coupled to a PCIe fabric that PCIe enumeration has completed, or that some other event has occurred, are described herein. A peripheral device having its own memory address space executes a boot read-only memory (ROM) to initialize a PCIe-to-internal memory address space bridge and to disable extended message signal interrupts or "MSIx" interrupts. The peripheral device monitors a specific location in memory dedicated to MSIx interrupts for a particular value that indicates that PCIe device enumeration is complete. At this point, the peripheral device knows that its PCIe base address registers have been set by the host, and sets address translation registers for translating addresses in the address space of the host to the address space of the peripheral device.

Figure 1:
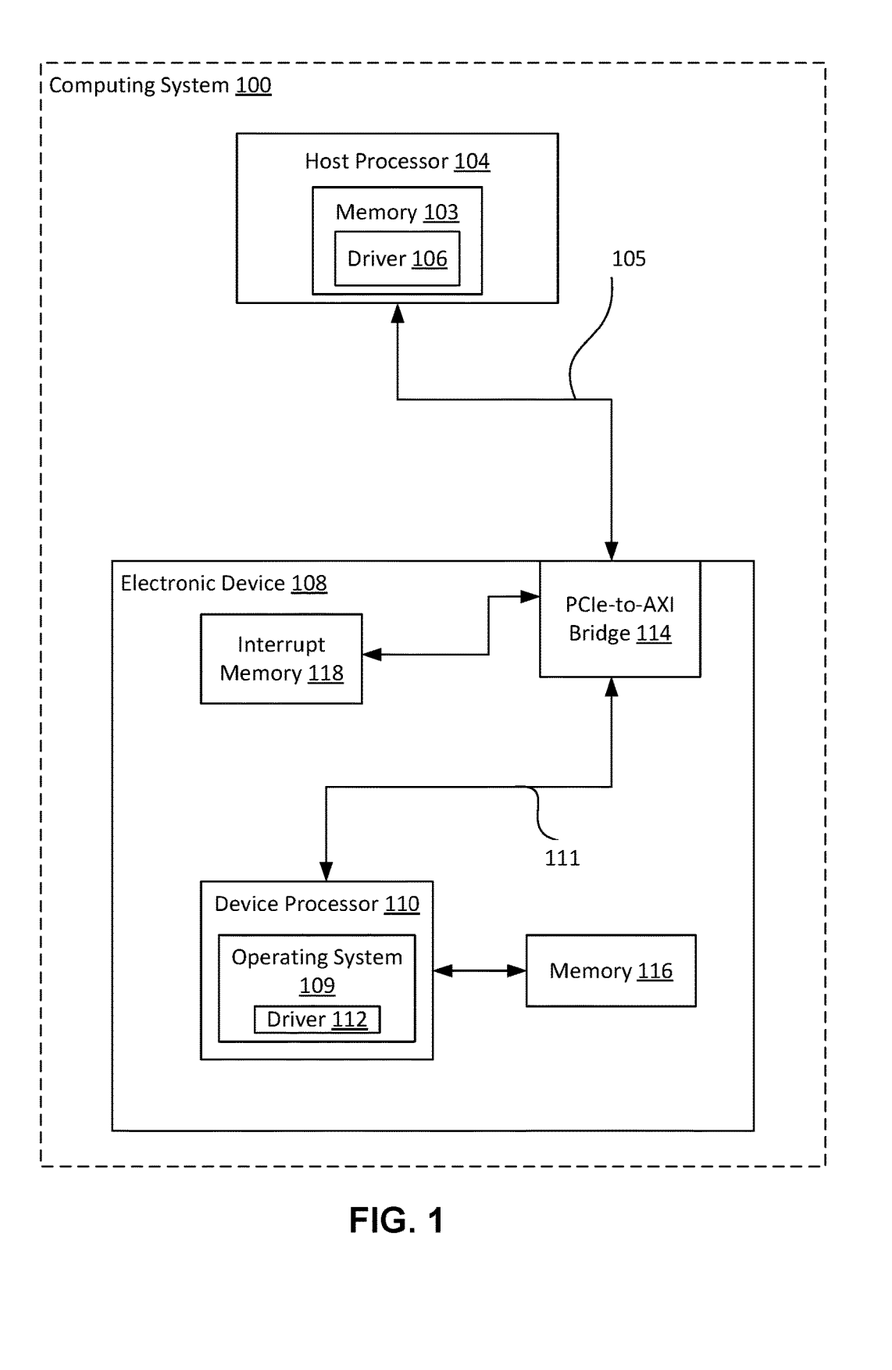
FIG. 1 is a block diagram of a computer system, according to an example.

FIG. 1 is a block diagram of a computer system 100, according to an example. Computer system 100 includes a host processor 104 coupled to an electronic device 108 via an interconnect fabric 105. The interconnect fabric 105 may be a peripheral component interconnect express ("PCIe") fabric including various components such as links, one or more (or zero) switches, and the like. In such an embodiment, host processor 104 would include a root complex of the PCIe fabric and PCIe-to-AXI bridge 114 (along with a PCIe controller in the electronic device 108) would act as a PCIe endpoint.

Host processor 104 includes one or more physical processors that execute instructions stored in a memory 103. Host processor 104 may communicate with electronic device 108 via interconnect fabric 105, using the PCIe protocol (the most recent version of which is specified in the PCIe 3.0 standard, maintained and developed by PCI-SIG of Beaverton, Oreg.).

Before "normal" communication occurs over interconnect fabric 105, host processor 104 performs enumeration of peripheral devices coupled to the interconnect fabric 105. Enumeration involves discovering devices coupled to the interconnect fabric 105, as well as setting various configuration data for the discovered devices. One type of the configuration data that is set is base address register values. These values specify the system memory address range that has been assigned to a particular device connected to interconnect fabric 105. Note that PCIe peripheral devices may be assigned multiple memory address ranges, with different base address registers storing different base address values for each such memory address range.

PCIe allows for addressing of communications in different ways. One technique for addressing communications involves transmitting packets over the PCIe fabric, where the packet specifies an address within the memory space of system memory (which may be referred to herein as "the PCIe address space"). The PCIe fabric routes such communications to the proper peripheral device based on the address. To facilitate this form of communication, host processor 104, during device enumeration, writes base addresses to base address registers in each peripheral device. These base addresses indicate the beginning of a memory space allocated to the peripheral device. Packets are routed by address by determining which device is assigned to the address range that includes that address and transmitting the packet to the identified device.

Some peripheral devices connected to an interconnect fabric 105 include their own memory that can be addressed in an address space that is local to the peripheral device. One example of such a peripheral device is electronic device 108, and one example of the memory is internal memory 116. Such peripheral devices may also include an interrupt memory which is specifically assigned to interrupt functions and may be physically separate from the internal memory (or may not be physically separate from the internal memory).

Note that electronic device 108 includes components such as interrupt memory 118, memory 116, which is local to electronic device 108, and may include other components that are not shown in FIG. 1. One or more of these components may be connected together via an interconnect fabric, an example of which is the AXI ("Advanced eXtensible Interface") interconnect system, which is part of the AMBA ("Advanced Microcontroller Bus Architecture") architecture standard, maintained and developed by ARM Holdings plc of Cambridge, England. The addressing space utilized in the context of the AXI interconnect system will be referred to herein as the "AXI" addressing space.

Because of the different address spaces utilized in computing system 100, electronic device 108 includes a PCIe-to-AXI bridge 114. One of the functions of the PCIe-to-AXI bridge 114 is to translate memory addresses from the PCIe address space to the AXI address space and vice versa. More specifically, when electronic device 108 receives communications via the interconnect fabric 105, those communications may include addresses in the PCIe address space. Electronic device 108 converts those PCIe addresses to AXI addresses. Similarly, PCIe-to-AXI bridge 114 may receive communications from within electronic device 108, where the communications include an address in the AXI address space. PCIe-to-AXI bridge 114 converts such AXI addresses to PCIe addresses for transmission via interconnect fabric 105.

Electronic device 108 may be configured to perform actions at the request of host processor 104. Among other things, as part of initialization of electronic device 108, host processor 104 provides a custom boot image referred to as a first stage boot loader ("FSBL") to electronic device 108. The FSBL performs various actions for initializing electronic device 108. Such actions may include, for example, loading an operating system for execution by electronic device 108, configuring components of electronic device 108, and other actions.

Host processor 104 is unable to efficiently transfer the FSBL to electronic device 108 unless address translation is set up in PCIe-to-AXI bridge 114. More specifically, in order for host processor 104 to efficiently transfer data into the general purpose memory 116 of electronic device 108, address translations must already be set up in PCIe-to-AXI bridge 114, so that packets received via interconnect fabric 105 can be directed to designated locations within memory 116. However, when computer system 100 is first initialized, those address translations are not set up in PCIe-to-AXI bridge 114.

To set up address translations, which consist of conversions between addresses in the PCIe address space and the AXI address space (and vice versa), electronic device 108 first must know which portions of the PCIe address space are assigned to electronic device 108. Host processor 104 transmits this information to electronic device 108 during PCIe enumeration. The PCIe standard dictates that this information can change at any time during PCIe enumeration and is only "finalized" once PCIe enumeration is completed. Thus, electronic device 108 waits until enumeration is complete (that is, every device coupled to interconnect fabric 105 has been enumerated) before setting up address translations for PCIe-to-AXI bridge 114.

The PCIe standard has no defined way to inform peripheral devices that enumeration is complete. There are several ways that such information could be communicated to electronic device 108. However, each (except for the techniques presented with respect to FIGS. 2 and 3) has drawbacks, such as the drawback of presenting a security risk for electronic device 108 or of potentially violating the PCIe standard. Several of these techniques are now described.

One technique is the use of vendor-defined messages. These messages are defined in the PCIe standard and are designed to allow vendors to create extensions to the PCIe standard. Vendor defined messages have a header that indicates that the message is vendor defined, includes a vendor ID, and also includes space for unique identification of a device by bus, device, and function. Such a message could be used to indicate that enumeration is done. For example, driver 106 in host processor 104 could generate such a message and transmit the message to electronic device 108, whereupon electronic device 108 would interpret the message as indicating that enumeration is complete. One issue, however, is that not all device drivers are able to generate and transmit vendor-defined messages and not all operating systems (upon whose functionality device drivers depend) are able to generate and transmit vendor-defined messages.

Another technique is to use the PCIe configuration space to indicate to electronic device 108 that enumeration has been completed. One issue with this, however, is that PCIe configuration space is defined and used by the PCIe communication system. Modifying data stored in PCIe registers for a purpose other than one related to the PCIe protocol would violate the PCIe standard and could potentially be unsafe.

Another technique would be to poll base address registers to detect when they are non-zero, and wait a pre-specified time after such detection. However, such a technique is not robust in the sense that the pre-specified time may overestimate or underestimate the actual time taken for enumeration and thus may either cause time to be wasted or cause the translation set up to be performed incorrectly.

A further technique is to expose the address translation registers to devices external to electronic device 108 (such as host processor 104). One issue with this technique, however, is that it compromises the security of the electronic device 108. For example, with such registers exposed, malicious software executing on host processor 104 could be able to write arbitrary data to any location in memory 116 of electronic device 108.

Figure 2:
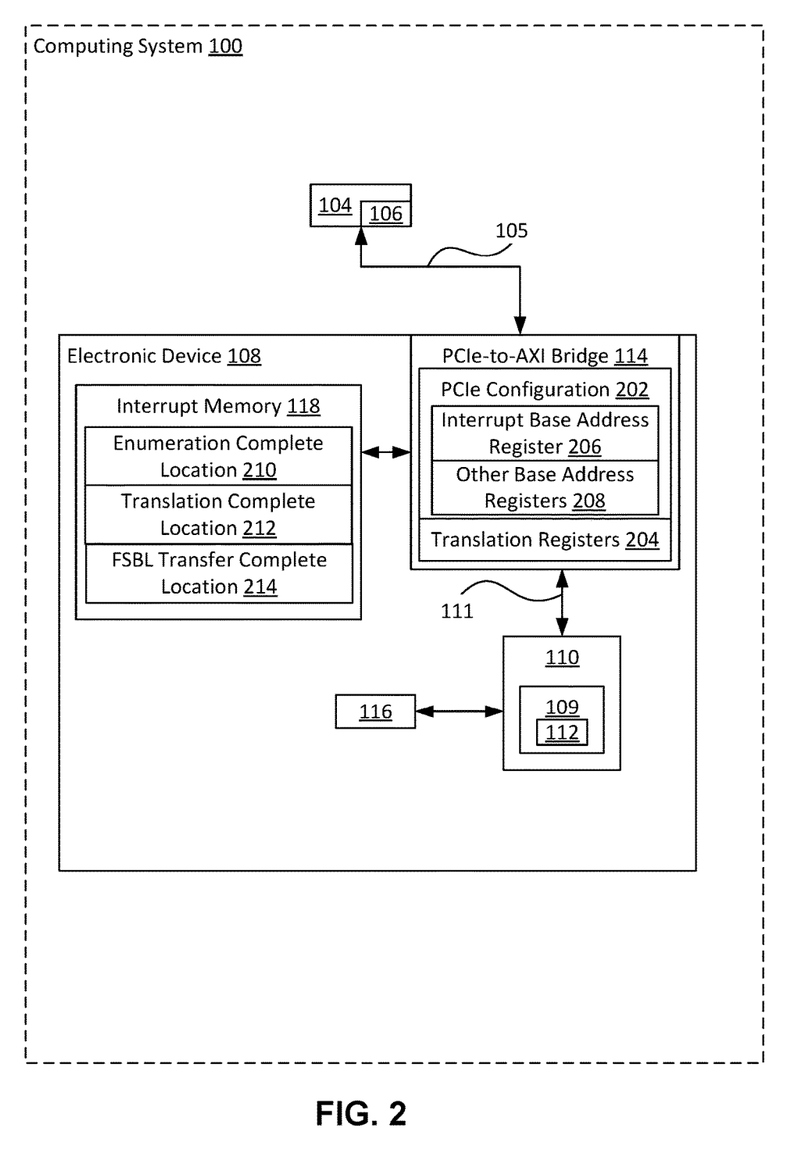
FIG. 2 is a block diagram of computer system showing additional details related to address translation and the like, according to an example.
Figure 3:
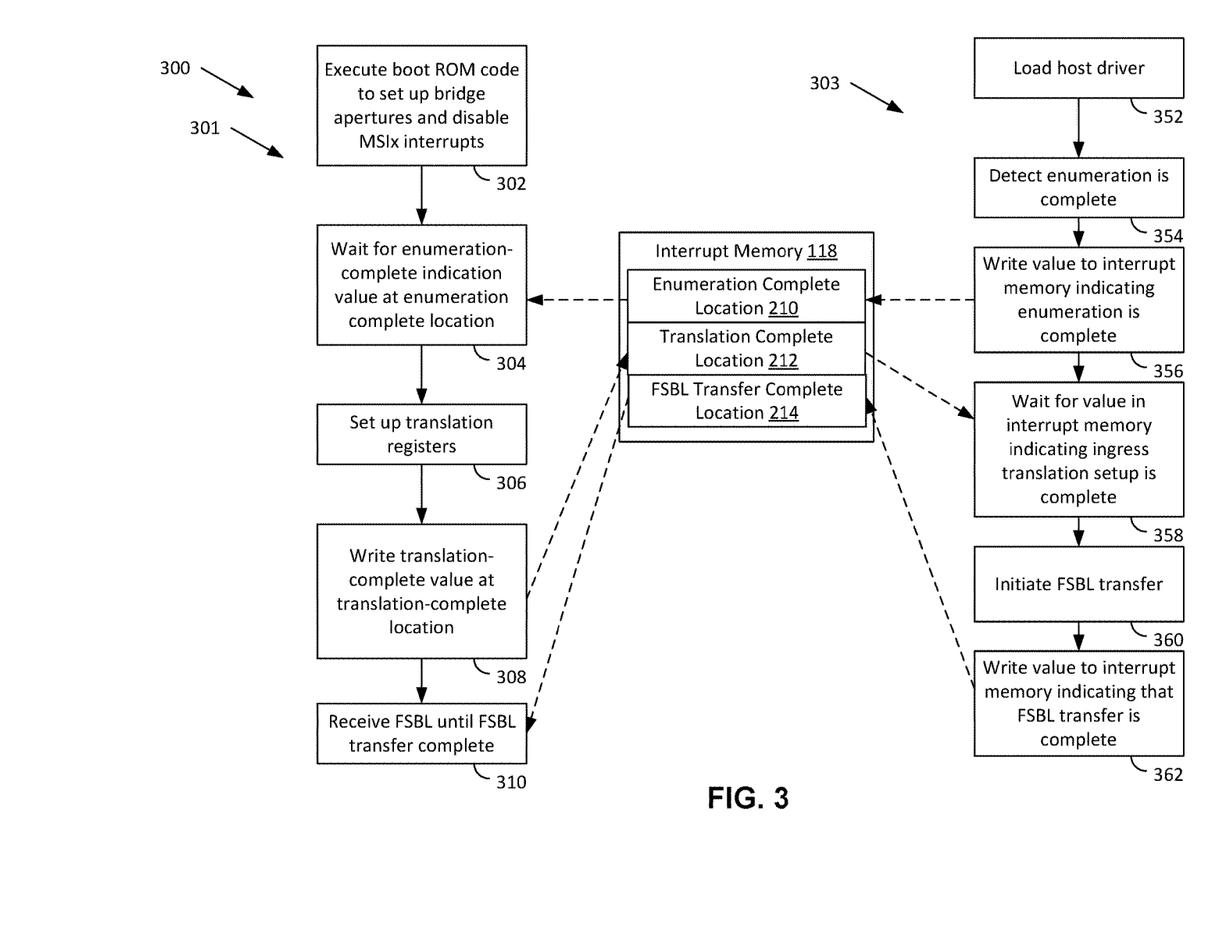
FIG. 3 is a flow diagram that illustrates a method for informing electronic device that enumeration has been completed.

Because the above techniques have drawbacks, techniques are provided herein, described with respect to FIGS. 2 and 3, whereby host processor 104 can securely and robustly inform electronic device 108 that enumeration has completed.

FIG. 2 is a block diagram of computer system 100 showing additional details related to address translation and the like, according to an example. In FIG. 2, computing system 100, as shown, includes all components of FIG. 1. FIG. 2 also shows specific memory locations within interrupt memory 118 and PCIe-to-AXI bridge 114, including enumeration complete location 210, translation complete location 212, and FSBL transfer complete location 214, in interrupt memory 118, as well as interrupt base address register 206, "other" base address registers 208, and translation registers 204.

In PCIe-to-AXI bridge 114, PCIe configuration registers 202 include registers that store information regarding the PCIe protocol. In general, host processor 104 writes to PCIe configuration registers 202 while electronic device 108 is being configured for use with interconnect fabric 105, during device enumeration. PCIe configuration registers 202 include "base address registers," which include an interrupt base address register 208 and other base address registers 208, as well as other configuration registers not shown. Note that PCIe-to-AXI bridge 114 communicates with device processor 110 via an AXI 111 interconnect fabric.

Each base address register is associated with a different "aperture" into the system memory space (PCIe memory space). An aperture is a "window" into the system memory space. More specifically, during enumeration, host processor 104 assigns particular chunks of system memory (i.e., memory in the "PCIe address space") to be used for communication between electronic device 108 and host processor 104. Each base address register indicates the starting address in system memory for a particular aperture. Note that electronic device 108 has more than one aperture, meaning that different sections of system memory are assigned to electronic device 108.

PCIe-to-AXI bridge 114 includes translation registers 204 that indicate the manner in which addresses in the PCIe address space are translated to addresses in the AXI address space (i.e., addresses in internal memory 116) and vice versa. Apertures defined by the "other base address registers 208" needs translation registers 204 to be set up in order to be able to interface with interconnect fabric 105. During the process of booting up electronic device 108, device processor 110 writes to translation registers 204 in order to configure address translation between address spaces. However, this process cannot happen until valid addresses are present in these "other" base address registers 208.

Unlike with translation registers 204 and "other" base address registers 208, interrupt memory 118, and the interrupt base address register 206 is "owned" by PCIe-to-AXI bridge 114. This means that PCIe-to-AXI bridge 114 is able to utilize interrupt memory 118 and interrupt base address register 206 without requiring any associated address translation within translation registers 204. More specifically, the manner in which the "other" base address registers 208 point to locations in internal memory 116 is customizable and thus configurable by software executing in device processor 110 (where the software may be, for example, an operating system 109 and/or a device driver 112 executing in the operating system 109). This customizability is the reason that translation registers 204 are present. On the other hand, communications received via interconnect fabric 105 that specify an address within the aperture identified by the address stored in the interrupt base address register 206 are routed to interrupt memory 118 without address translation. Because the interrupt base address register 206 is dedicated to interrupt memory 118, the interrupt base address register 206 may be utilized by PCIe-to-AXI bridge 114 before translation registers 204 are configured.

Note that interrupt memory 118 is typically used as a volatile memory location to store data for in-band interrupts such as MSI-x interrupts ("message-signaled interrupts-x"—defined as part of the PCIe specification). Note also that the interrupt base address register 206 is considered to be address #0 ("BAR0") in the PCIe standard, and is assigned to the PCIe-to-AXI bridge 114, while other base address registers (e.g., BAR1 to BAR5) are assigned to other locations within electronic device 108. (In some embodiments, the specific base address register number may be changed so that interrupt base address register 206 is a base address register other than BAR0, such as BAR1 or BAR2).

PCIe-to-AXI bridge 114 routes traffic with an address that is a known, fixed offset above the base address specified in the interrupt base address register 206 to interrupt memory 118. Note that the aperture associated with interrupt base address register 206 may be used for other things that just interrupt memory 118. Interrupt memory 118 thus begins at a fixed offset above the interrupt base address register 206. Note that the other purposes for which the interrupt base address register 206 may be used are not discussed herein, in order to provide conciseness and clarity.

As explained above, the PCIe configuration 202 (including the values in other base address registers 208) are "finalized" when enumeration by host processor 104 is complete. Thus, PCIe-to-AXI bridge 114 should set up translation register 204 when enumeration is complete. However, the PCIe standard does not have a built-in mechanism for informing devices that enumeration is complete. A technique for communicating this information is presented below with respect to FIG. 3.

FIG. 3 is a flow diagram that illustrates a method 300 for informing electronic device 108 that enumeration has been completed. Note that method 300 includes an electronic device flow 301, which is performed by electronic device 108, and a host processor flow 303, which is performed by host processor 104. Note that in some embodiments, these flows are performed in parallel and, unless a specific dependency is described (e.g., waiting for various events to happen), steps in either flow can be performed in any relative order including before, after, or simultaneously. For example, steps 302 and 352 may be performed at the same time or at different times. Further, although method 300 is described in the context of the system of FIGS. 1 and 2, those of skill in the art will understand that any system configured to perform the steps of method 300, in various technically feasible orders, will fall within the scope of this disclosure.

As shown, flow 301 begins with step 302, where electronic device 108 executes boot ROM (read only memory) code to set up bridge apertures for PCIe-to-AXI bridge 114. The boot ROM is a relatively small amount of built in firmware that is executed when electronic device 108 is powered on and that performs a limited number of actions. One action is setting up bridge apertures. These are AXI-side apertures that allow the bridge to claim transactions from the AXI side. In other words, these apertures allow the PCIe-to-AXI bridge 114 to "know" that transactions on the AXI interconnect 111 having certain specific addresses are "owned" and are thus to be used by the PCIe-to-AXI bridge 114.

Electronic device 108 also disables MSIx interrupts so that host 104 does not overwrite the contents of interrupt memory 118 while attempting to program the interrupt mechanisms of the electronic device 108. Overwriting the contents of interrupt memory 118 is an act that could possibly improperly write over memory locations that are to be used for method 300 (locations such as enumeration complete location 210, ingress translation setup complete location 212, and FSBL transfer complete location 214).

At step 304, electronic device 108 waits for an enumeration complete indication value at enumeration complete location 210. More specifically, both device driver 106 and boot ROM know of a specific location within interrupt memory 118 to use to indicate that enumeration is complete. This location is enumeration complete location 210. This location is a specific offset above the address stored in interrupt base address register 206. In one example, the offset is 0x00008000. In addition, both driver 106 and electronic device 108 know a specific value—the enumeration complete indication value—that is written to enumeration complete location 210 when enumeration is complete. During the wait step 304, electronic device 108 may periodically poll enumeration complete location 210 to determine whether the enumeration complete indication value has been written to that location. Flow 301 proceeds to step 306 when that value is detected at that location. At step 306, electronic device 108 sets up translation registers 204 so that PCIe-to-AXI address translation and AXI-to-PCIe address translation may be performed. Note that because the enumeration complete indication value has been written to the enumeration complete location 210, enumeration has been completed by the host processor 104, meaning that the values in the PCIe configuration 202 (including base address registers) are "finalized."

After setting up translation registers 204, electronic device 108 writes a translation-complete value at translation-complete location 212 in interrupt memory 118. After this, at step 310, electronic device 108 receives front side boot loader ("FSBL") from host processor 104 until transfer of FSBL is complete, which is indicated by a FSBL transfer complete value being written to FSBL transfer complete location 214.

For host processor flow 303, host 104 loads driver 106. Host completes enumeration, which driver 106 detects. In some embodiments, driver 106 "knows" that enumeration is complete simply because driver 106 has been started. In other words, the operating system of host 104 only starts driver 106 after enumeration has been completed. Driver 106 then writes the enumeration-complete indication value to the enumeration complete location 210, by performing a memory write of the enumeration-complete value to the system memory location that is mapped to the enumeration complete location 210 (via the interrupt base address register 206). This causes a packet to be transmitted across interconnect fabric 105 to electronic device 108, which writes the data in that packet to enumeration complete location 210 based on interrupt base address register 206 and the offset value for enumeration complete location 210 that is provided in the packet. After writing the enumeration-complete value to the enumeration complete location 210, host 104 waits for the translation-complete value to be stored in translation complete location 212. To determine if translation complete location 212 stores the translation-complete value, host 104 periodically reads from the system memory address associated with that location. Once host 104 detects that the translation-complete value is stored at translation complete location 212, host 104 proceeds to step 360.

At step 360, host initiates FSBL transfer. In some embodiments, FSBL transfer is performed in programmed input/output ("PIO") mode, whereby the host processor 104 sequentially transmits chunks of data to electronic device 108. Because translation has been set up by electronic device 108, electronic device 108 is able to store FSBL within memory 116 and/or other devices accessible to device processor 110 in the AXI address space. After host 104 transmits the FSBL, host 104 writes a FSBL transfer complete value to FSBL transfer complete location 214.

Note that after FSBL transfer is complete, electronic device 108 may have interrupts (e.g., MSI-x) re-enabled, since the interrupt memory 118 is no longer needed for FSBL transfer. To do this, electronic device 108 re-enables interrupts and device driver 106 causes the operating system of host 104 to re-enumerate electronic device 108 by, for example, hot-swapping the device (e.g., soft-swapping the device out and then back in).

Note that although described for use in informing an electronic device that enumeration is complete, where the electronic device is connected as an endpoint to an interconnect fabric 105, which may be a PCIe interconnect fabric, the techniques provided herein could alternatively or additionally be used for other notifications to such an electronic device.

Figure 4:
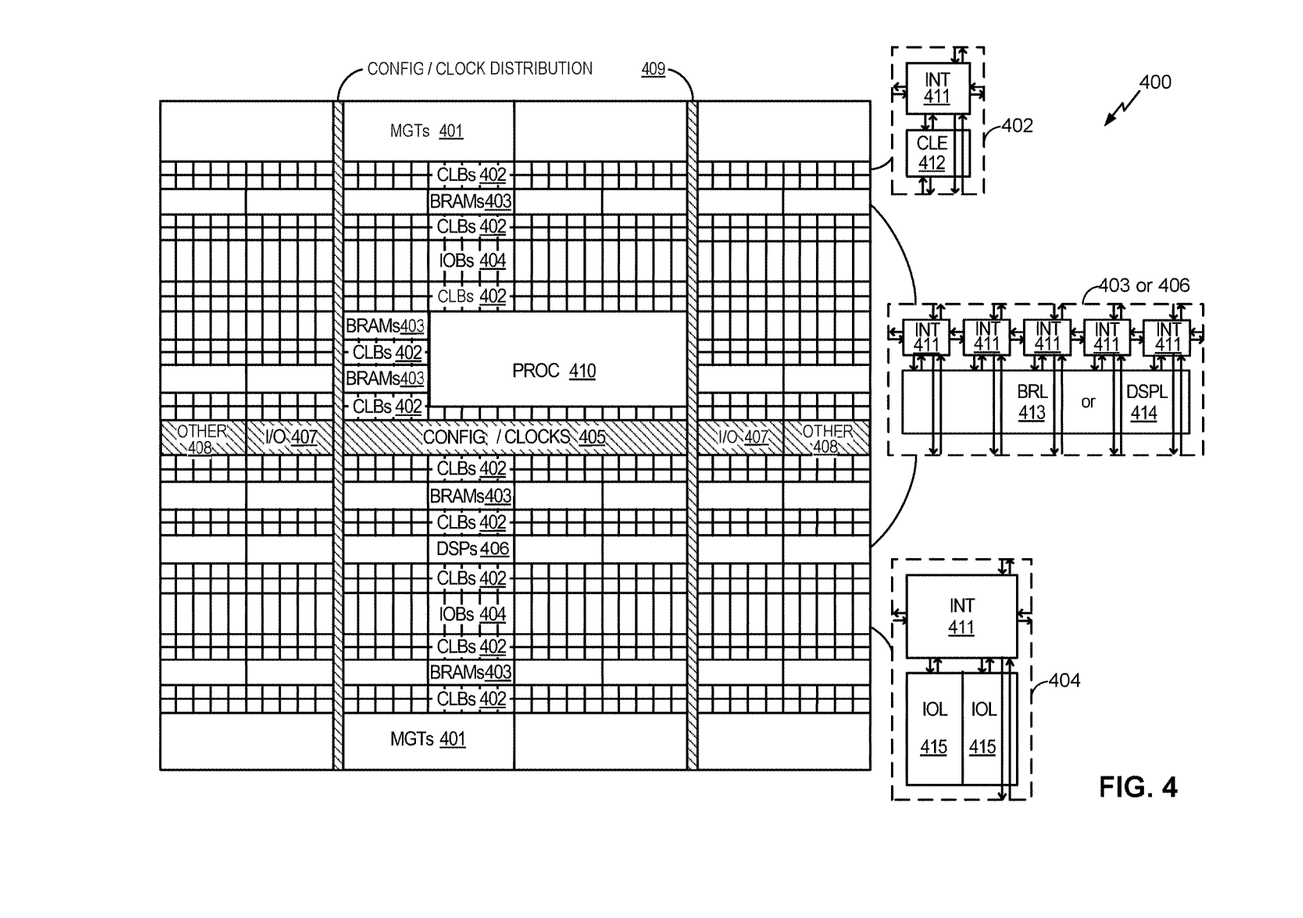
FIG. 4 is a block diagram of an integrated circuit ("IC"), according to an example.

FIG. 4 is a block diagram of an integrated circuit ("IC") 400, according to an example. Electronic device 108 of FIG. 1 may be embodied as IC 400. IC 400 includes a large number of different programmable tiles including multi-gigabit transceivers ("MGTs") 401, configurable logic blocks ("CLBs") 402, random access memory blocks ("BRAMs") 403, input/output blocks ("IOBs") 404, configuration and clocking logic ("CONFIG/CLOCKS") 405, digital signal processing blocks ("DSPs") 406, specialized input/output blocks ("I/O") 407 (e.g., configuration ports and clock ports), and other programmable logic 408 such as digital clock managers, analog-to-digital converters, system monitoring logic, and so forth. The IC 400 may be a field programmable gate array ("FPGA") architecture. IC 400 also includes a dedicated processor, also referred to as a "processing system" or "PROC" 410. Each component illustrated in the electronic device 108 of FIG. 1 may be included in PROC 410.

Optionally, each programmable tile includes a programmable interconnect element ("INT") 411 having standardized connections to and from a corresponding interconnect element in each adjacent tile. The programmable interconnect elements taken together implement the programmable interconnect structure for the illustrated IC 400. The programmable interconnect element 411 also includes the connections to and from the programmable logic element within the same tile, as shown by the examples included at the top of FIG. 4.

For example, a CLB 402 can include a configurable logic element ("CLE") 412 that can be programmed to implement user logic plus a single programmable interconnect element ("INT") 411. A BRAM 403 can include a BRAM logic element ("BRL") 413 in addition to one or more programmable interconnect elements 411. Typically, the number of interconnect elements 411 included in a tile depends on the height of the tile. In the pictured IC 400, a BRAM tile 403 has the same height as five CLBs 402, but other numbers (e.g., four) can also be used. A DSP tile 406 can include a DSP logic element ("DSPL") 414 in addition to an appropriate number of programmable interconnect elements 411. An 10B 404 can include, for example, two instances of an input/output logic element ("IOL") 415 in addition to one instance of the programmable interconnect element 411. As will be clear to those of skill in the art, the actual I/O pads connected, for example, to the I/O logic element 415 typically are not confined to the area of the input/output logic element 415.

In the pictured IC 400, a horizontal area near the center of the die (shown in FIG. 4) is used for configuration, clock, I/O 407, and other control logic. Vertical columns 409 extending from this horizontal area or column are used to distribute the clocks and configuration signals across the breadth of the IC.

Optionally, IC 400 includes additional logic blocks that disrupt the regular columnar structure making up a large part of the IC. The additional logic blocks can be programmable blocks and/or dedicated logic. For example, processor block 410 spans several columns of CLBs and BRAMs.

PROC 410 can be implemented as a hard-wired processor that is fabricated as part of the die that implements the programmable circuitry of the IC 400 and does not include the programmable tiles included within the PL domain. PROC 410 can represent any of a variety of different processor types and/or systems ranging in complexity from an individual processor, e.g., a single core capable of executing program code, to an entire processor system having one or more cores, modules, co-processors, interfaces, or the like.

In a more complex arrangement, for example, PROC 410 can include one or more cores, e.g., central processing units, cache memories, a memory controller, unidirectional and/or bidirectional interfaces configurable to couple directly to I/O pins, e.g., I/O pads, of the IC 400 and/or couple to the programmable circuitry of the IC 400. The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC 400. For example, portions shown in FIG. 4 that are external to PROC 410 can be considered part of the, or the, programmable circuitry of the IC 400.

Note that FIG. 4 is intended to illustrate only an exemplary IC 400 architecture. For example, the numbers of logic blocks in a row, the relative width of the rows, the number and order of rows, the types of logic blocks included in the rows, the relative sizes of the logic blocks, and the interconnect/logic implementations included at the top of FIG. 4 are purely exemplary. For example, in an actual IC 400 more than one adjacent row of CLBs 402 is typically included wherever the CLBs 402 appear, to facilitate the efficient implementation of user logic, but the number of adjacent CLB 402 rows varies with the overall size of the IC 400.

The various examples described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more example implementations may be useful machine operations. In addition, one or more examples also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various examples described herein may be practiced with other computer system configurations including handheld devices, microprocessor systems, microprocessor-based or programmable consumer electronics, minicomputers, mainframe computers, and the like.

One or more examples may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a Compact Disc (CD)-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

While the foregoing is directed to specific example implementations, other and further example implementations may be devised without departing from the basic scope thereof, and the scope thereof is determined by the claims that follow.

What is claimed is:

1. An electronic device, comprising:
a processor;
a memory coupled to the processor for storing instructions for execution by the processor;
an interrupt memory; and
an interconnect fabric bridge coupled to the processor and to the interrupt memory, the interconnect fabric bridge including a translation register, the interconnect fabric bridge configured to translate memory addresses in a first memory address space associated with a host processor external to the electronic device to memory addresses in a second memory address space associated with the memory that is coupled to the processor, based on a translation value stored in the translation register, wherein the second memory address space is associated with an Advanced eXtensible Interface (AXI) interconnect fabric that couples the processor to the memory, wherein the instructions stored in the memory cause the processor to:
  wait for an enumeration-complete indication value to be stored at an enumeration complete location within the interrupt memory, and
  upon detecting that the enumeration-complete indication value is stored at the enumeration complete location, assign the translation value to the translation register.

2. The electronic device of claim 1, wherein the instructions stored in the memory further cause the processor to:
  disable interrupts that are activated via messages received by the interconnect fabric bridge across an interconnect fabric that is coupled to the host processor external to the electronic device.

3. The electronic device of claim 2, wherein the instructions stored in the memory further cause the processor to:
  enable interrupts that are activated via messages received by the interconnect fabric bridge across the interconnect fabric that is coupled to the host processor after assigning the translation value to the translation register.

4. The electronic device of claim 1, wherein the instructions stored in the memory further cause the processor to:
  upon writing the translation value to the translation register, write a translation complete value to a translation complete location in the interrupt memory.

5. An electronic device comprising:
  a processor;
  a memory coupled to the processor for storing instructions for execution by the processor;
  an interrupt memory; and
  an interconnect fabric bridge coupled to the processor and to the interrupt memory, the interconnect fabric bridge including a translation register, the interconnect fabric bridge configured to translate memory addresses in a first memory address space associated with a host processor external to the electronic device to memory addresses in a second memory address space associated with the memory that is coupled to the processor, based on a translation value stored in the translation register, wherein the instructions stored in the memory cause the processor to:
    wait for an enumeration-complete indication value to be stored at an enumeration complete location within the interrupt memory,
    upon detecting that the enumeration-complete indication value is stored at the enumeration complete location, assign the translation value to the translation register,
    receive a front side boot loader from the host processor, and
    store the front side boot loader at a location in the memory that is based on the translation value.

6. The electronic device of claim 5, wherein the instructions stored in the memory further cause the processor to:
  upon detecting that a front side boot loader complete value is stored at a front side boot loader transfer complete location in the interrupt memory, stop receiving the front side boot loader from the host processor.

7. The electronic device of claim 1, wherein:
accessing values stored in the interrupt memory is not dependent on translation values.

8. The electronic device of claim 1, wherein:
  the first memory address space is associated with a peripheral component interconnect express (PCIe) interconnect fabric that couples the processor to the host processor.

9. A method, comprising:
  translating memory addresses in a first memory address space associated with a host processor external to an electronic device to memory addresses in a second memory address space associated with a second memory that is coupled to a processor internal to the electronic device, based on a translation value stored in a translation register included within an interconnect fabric bridge that is coupled to the processor and to an interrupt memory, wherein the second memory address space is associated with an Advanced eXtensible Interface (AXI) interconnect fabric that couples the processor to the second memory;
  waiting for an enumeration-complete indication value to be stored at an enumeration complete location within the interrupt memory; and
  upon detecting that the enumeration-complete indication value is stored at the enumeration complete location, assigning the translation value to the translation register.

10. The method of claim 9, further comprising:
  disabling interrupts that are activated via messages received by the interconnect fabric bridge across an interconnect fabric that is coupled to the host processor external to the electronic device.

11. The method of claim 10, further comprising:
  enabling interrupts that are activated via messages received by the interconnect fabric bridge across the interconnect fabric that is coupled to the host processor after assigning the translation value to the translation register.

12. The method of claim 9, further comprising:
  upon writing the translation value to the translation register, writing a translation complete value to a translation complete location in the interrupt memory.

13. The method of claim 9, further comprising:
  receiving a front side boot loader from the host processor, and
  storing the front side boot loader at a location in the memory that is based on the translation value.

14. The method of claim 13, further comprising:
  upon detecting that a front side boot loader complete value is stored at a front side boot loader transfer complete location in the interrupt memory, stopping receiving the front side boot loader from the host processor.

15. The method of claim 9, wherein:
  accessing values stored in the interrupt memory is not dependent on translation values.

16. The method of claim 9, wherein:
  the first memory address space is associated with a peripheral component interconnect express (PCIe) interconnect fabric that couples the processor to the host processor.

17. A non-transitory computer-readable medium storing instructions that, when executed by a processor, cause the processor to perform a method, the method comprising:
  translating memory addresses in a first memory address space associated with a host processor external to an electronic device to memory addresses in a second memory address space associated with a second memory that is coupled to the processor, which is internal to the electronic device, based on a translation value stored in a translation register included within an interconnect fabric bridge that is coupled to the processor and to an interrupt memory, wherein the second memory address space is associated with an Advanced eXtensible Interface (AXI) interconnect fabric that couples the processor to the second memory;

waiting for an enumeration-complete indication value to be stored at an enumeration complete location within the interrupt memory; and upon detecting that the enumeration-complete indication value is stored at the enumeration complete location, assigning the translation value to the translation register.

18. The non-transitory computer-readable medium of claim 17, wherein the method further comprises:

disabling interrupts that are activated via messages received by the interconnect fabric bridge across an interconnect fabric that is coupled to the host processor external to the electronic device.

* * * * *